United States Patent [19]

Arbisi et al.

[11] Patent Number: 4,659,485
[45] Date of Patent: Apr. 21, 1987

[54] METHOD AND APPARATUS FOR AERATING FLOWING WATER RACEWAYS

[75] Inventors: Dominic S. Arbisi, Minnetonka; Thomas A. Rasmussen, Moundsview, both of Minn.

[73] Assignee: Aeras Water Resources, Inc., Eden Praire, Minn.

[21] Appl. No.: 824,776

[22] Filed: Jan. 31, 1986

[51] Int. Cl.⁴ ............................................. C02F 7/00
[52] U.S. Cl. .................................... 210/758; 210/620; 210/220; 210/255; 210/926; 261/76; 261/121 R; 261/121.1
[58] Field of Search ............ 261/DIG. 75, 125, 121 R, 261/76; 210/220, 255, 221.2, 620, 221.1, 758, 194, 199, 629, 926

[56] References Cited

U.S. PATENT DOCUMENTS

| | | | |
|---|---|---|---|
| 3,826,742 | 7/1974 | Kirk et al. | 210/220 |
| 3,925,208 | 12/1975 | Yost | 210/220 |
| 3,945,918 | 3/1976 | Kirk | 210/255 |
| 3,976,575 | 8/1976 | Sullins | 210/255 |
| 4,219,424 | 8/1980 | Tamura et al. | 210/255 |
| 4,522,151 | 6/1985 | Arbisi et al. | 261/76 |

FOREIGN PATENT DOCUMENTS

| | | | |
|---|---|---|---|
| 547608 | 3/1932 | Fed. Rep. of Germany | 210/255 |
| 969681 | 10/1982 | U.S.S.R. | 210/220 |

Primary Examiner—Benoit Castel

[57] ABSTRACT

Method and apparatus for aerating flowing water which includes a plurality of successive aerating chambers having divider baffles therein to direct the flowing water downwardly while introducing a flow of oxygen and water thereto and permit the oxygen level in the flowing water to be maximized.

3 Claims, 3 Drawing Figures

METHOD AND APPARATUS FOR AERATING FLOWING WATER RACEWAYS

SUMMARY OF THE INVENTION

This invention relates to apparatus for aerating flowing liquid which includes a series of cascading chambers provided with flow control baffles with the lower edges of the baffles raised above the bottom of the chambers to produce downward flow of the liquid to be aerated downwardly around the bottom of each baffle and upwardly on the downstream side thereof while introducing air into the downwardly flowing liquid. The invention also relates to the method of aerating flowing liquid which includes cascading liquid through successive flow chambers and aerating the flowing liquid while passing through said chambers. It is vital that the downward flow velocity is greater than the buoyant rise velocity of the air bubbles being delivered into the downwardly flowing liquid to prevent the air bubbles from rising on the downward side of the baffle and cause the aerated flow to travel down with the flowing water. This is ensured by the delivery of air and water mixture through a plurality of nozzles positioned across the baffle on the downward side thereof which will combine with downward flow of the water to be aerated and impart sufficient impetus to produce the required downward flow of the air bubbles with the downwardly flowing water to the bottom of each chamber.

DETAILED DESCRIPTION OF THE PREFERRED EMBODIMENT

A stream of flowing water is confined by a raceway 9. A series of aerating chambers 10-15 are provided across the entire width of the raceway 9, and the upper edges of said chambers are progressively lower in the downstream direction as illustrated.

The respective chambers 10-15 are separated by upwardly extending sidewall partitions respectively designated by the numerals 16-20. Water damming baffles 21-26 are inserted into the chambers 10-15 to divide the chambers, as illustrated. The lower edges of the baffles are spaced above the bottom of the chambers to define a U-shaped flow path. The upper edges of the baffles extend upwardly above the elevation of the surface of the flowing water to ensure that the entire water flow to be aerated will be directed successively through the respective aerating chambers 10-15. As stated, the baffles extend above the level of the flowing water and, of course, substantially above the upper edges of the respective partitions or risers 16-20.

Figure 1:
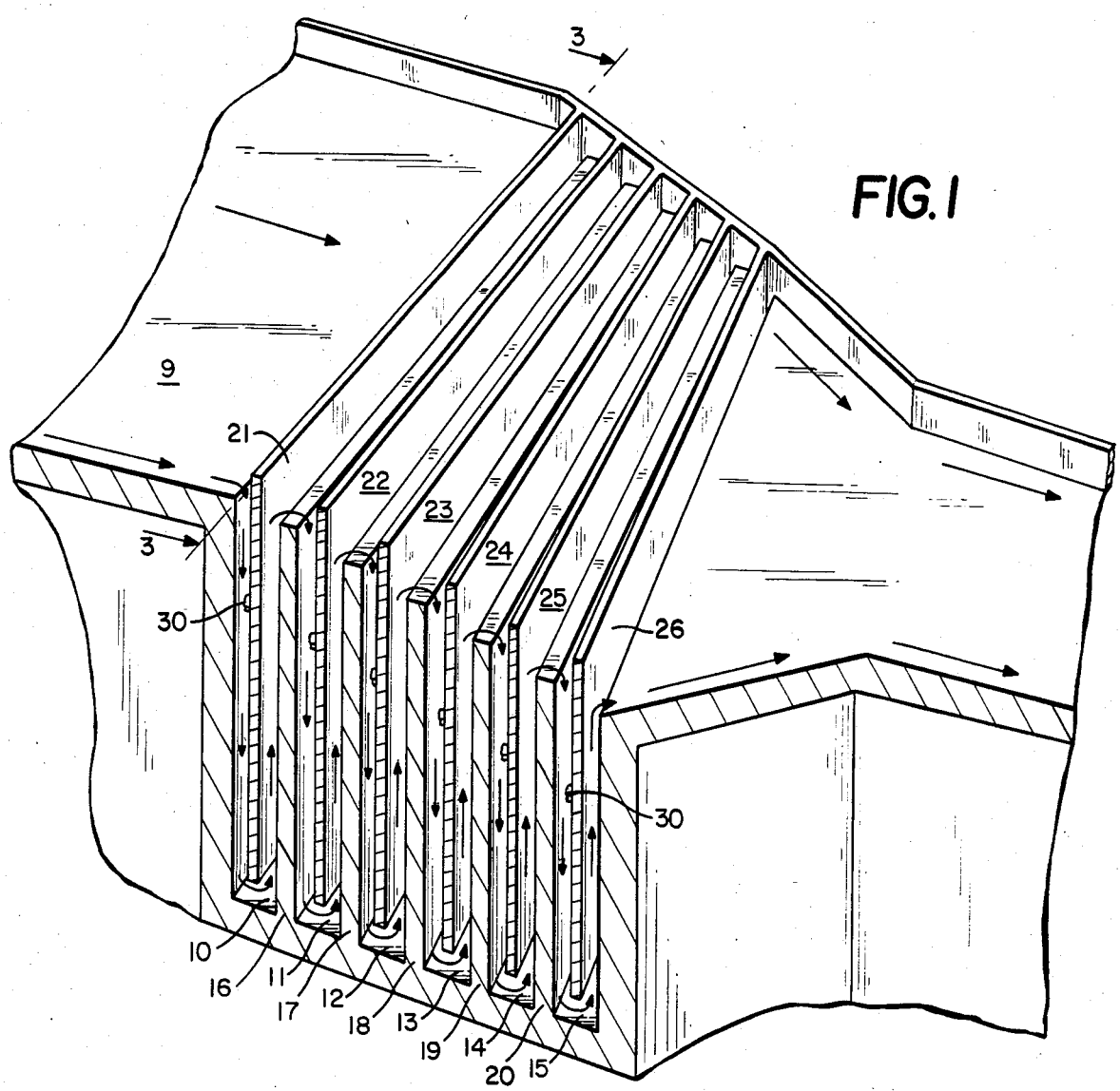
FIG. 1 is a perspective sectional view showing the successive aerating chambers.
Figure 2:
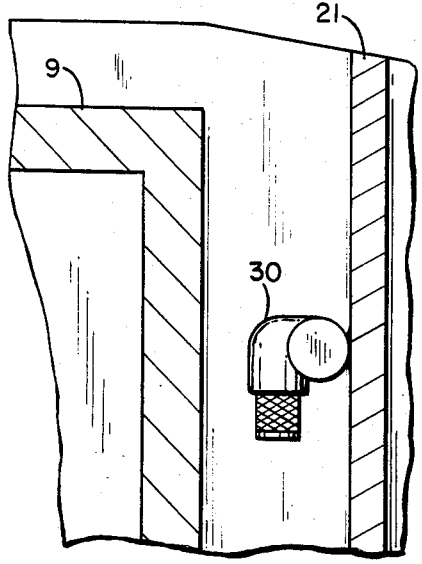
FIG. 2 is an enlarged transverse sectional view of one of the chambers showing the aerating nozzle.
Figure 3:
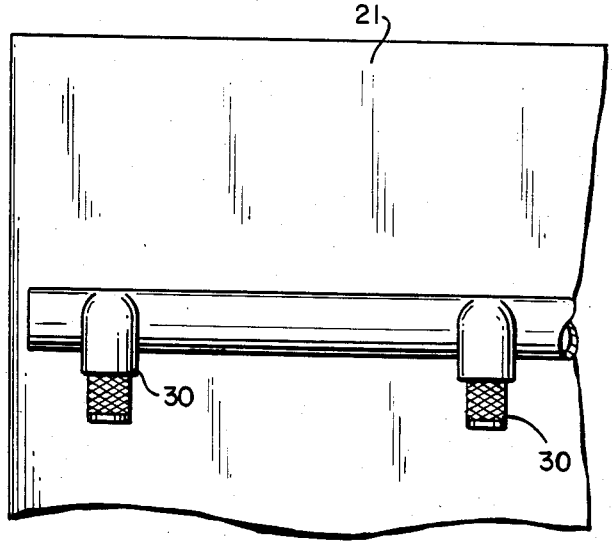
FIG. 3 is a view showing in elevation the arrangement of the nozzles in each of the aerating chambers.

Air is interjected with a pressurized water supply into the downwardly flowing water on the downflow side of each of the baffles 21-26 as by a plurality of air and water discharge nozzles 30 spaced across the baffles as shown diagrammatically in FIG. 3. The construction of each aerating nozzle 30 can be similar to that disclosed and claimed in prior U.S. Pat. No. 4,522,151 or the nozzle disclosed and claimed in the co-pending U.S. application for patent filed contemporaneously herewith Ser. No. 824,773. It is important that the velocity of the downwardly flowing water and air on the upstream side of each of the baffles 21-26, is sufficient to prevent the air bubbles being discharged from the nozzles 30 from rising against the downward flow of water into the bottom of the respective chambers 10-15.

The elevation of the nozzles can also be adjueted to ensure that the flow of the discharged air bubbles will not reverse direction, but will continue in a downwardly direction to the bottom of each baffle in each chamber.

It will be seen that we have provided a relatively simple, yet highly efficient method and apparatus for aerating water flowing through raceways and it will be understood that various changes may be made in the form, details and arrangement of the parts set forth in the appended claims without departing from the scope of the invention.

What is claimed is:

1. Apparatus for aerating flowing water in a raceway comprising:
    a plurality of aerating chambers arranged to successively receive in cascading arrangement the water flow to be aerated,
    a plurality of divider baffles interposed into each chamber with the lower edge of each baffle spaced upwardly from the botom of each chamber to divide each chamber into an upstream down flow side and a downstream upflow side and having the upper edge thereof sufficiently elevated above the upstream water level to cause diversion of the entire flow downwardly and upwardly through each chamber, means for supplying pressurized water and means for supplying pressurized air, and
    a plurality of downwardly directed aerating nozzles fluidly connected to each of said means and mounted in each of said chambers on the upstream down flow side of the respective divider baffles positioned to direct a flow of air and water into the down flow stream so that the combined force of air and water discharged and the downwardly flowing water received at the top of the chamber will carry the discharged air downwardly into the chamber bottom and around the lower edge of the respective baffles to ensure maximum absorption of the air into the water stream, the upper ends of successive chambers being disposed at progressively lower elevations from the upstream to downstream direction of flow through the chambers, whereby the decrease in water density progressively through successive aerating chambers progressively reduces the head pressure in the chambers so that the flow through is assisted by the density differentials between the respective down flow and upflow densities within the chambers.

2. The structure set forth in claim 1 wherein the downwardly directed nozzles are mounted on each of the baffles.

3. The method of aerating flowing water comprising:
    providing a plurality of aerating chambers arranged to successively receive in cascading arrangement the water flow to be aerated,
    providing a plurality of divider baffles interposed into each chamber with the lower edge of each baffle spaced upwardly from the bottom of each chamber to divide each chamber into an upstream down flow side and a downstream upflow side and having the upper edge thereof sufficiently elevated above the upstream water level to cause diversion of the entire flow downwardly and upwardly through each chamber, providing a pressurized water supply and a pressurized air supply, providing a plurality of downwardly directed aerating nozzles fluidly connected to the pressurized water supply and the pressurized air supply and mounted in each of said chambers on the upstream down flow side of the respective divider baffles, causing the flowing water to pass successively downwardly and upwardly through said aerating chambers, and injecting through said nozzles sufficient downwardly directed flow of air and water into the downward flow path of the water to be aerated in each chamber to carry the discharged air downwardly into the chamber bottom and permit the intermixed air and water to pass upwardly on the upflow side of each chamber.

* * * * *